United States Patent
Seo et al.

(10) Patent No.: US 7,366,402 B2
(45) Date of Patent: Apr. 29, 2008

(54) METHOD AND APPARATUS OF RECORDING A HIGH DEFINITION DIGITAL TELEVISION BROADCAST SIGNAL

(75) Inventors: Kang Soo Seo, Kyunggi-do (KR); Jea Yong Yoo, Seoul (KR); Byung Jin Kim, Kyunggi-do (KR); Hyung Sun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1033 days.

(21) Appl. No.: 09/872,461

(22) Filed: Jun. 1, 2001

(65) Prior Publication Data

US 2002/0064371 A1    May 30, 2002

(51) Int. Cl.
*H04N 5/91* (2006.01)

(52) U.S. Cl. .................. 386/94; 386/6; 386/7; 386/8; 386/33; 386/68; 386/111; 386/112; 386/46; 348/441

(58) Field of Classification Search .............. 386/94, 386/6–8, 33, 68, 111–112, 46; 348/441
See application file for complete search history.

(56) References Cited

U.S. PATENT DOCUMENTS

| | | | | |
|---|---|---|---|---|
| 5,377,051 A | * | 12/1994 | Lane et al. .................. 386/81 |
| 5,535,008 A | * | 7/1996 | Yamagishi et al. ......... 386/109 |
| 5,832,085 A | * | 11/1998 | Inoue et al. ................. 386/124 |
| 6,118,486 A | * | 9/2000 | Reitmeier .................... 348/441 |
| 6,169,843 B1 | * | 1/2001 | Lenihan et al. ............... 386/46 |
| 6,467,093 B1 | * | 10/2002 | Inoue et al. ................. 725/151 |
| 6,618,549 B1 | * | 9/2003 | Kato et al. .................... 386/94 |
| 6,865,747 B1 | * | 3/2005 | Mercier ....................... 725/94 |

* cited by examiner

*Primary Examiner*—Thai Q. Tran
*Assistant Examiner*—Helen Shibru
(74) *Attorney, Agent, or Firm*—Birch, Stewart, Kolasch & Birch, LLP

(57) ABSTRACT

The present invention relates to a method and apparatus of recording a directly-received digital television broadcast signal. This method demodulates a received high definition digital television broadcast signal, extracts transport stream belonging to a chosen channel among the demodulated data stream, analyzes data of the transport stream, extracts and creates data stream- and/or recording-related information, and writes the data stream- and/or recording-related information and the extracted transport stream to a recording medium in a format suitable to the extracted and created information. According to the present method and apparatus, it is possible to record a high definition digital television broadcast signal without any intermediary set top box to a high-density recording medium in the appropriate recording format as well as to conduct a trick play for recorded television broadcast signal smoothly with such recorded format and the data stream- and/or recording-related information.

28 Claims, 4 Drawing Sheets

METHOD AND APPARATUS OF RECORDING A HIGH DEFINITION DIGITAL TELEVISION BROADCAST SIGNAL

BACKGROUND OF THE INVENTION

1. Field of the Invention

The present invention relates to a method and apparatus of recording a high definition digital television (HDTV) broadcast signal to a high-density disk storage medium such as a HD-DVD (High-Density Digital Versatile Disk).

2. Description of the Related Art

A conventional analog television signal is transmitted through air or cable after AM or FM modulation.

In these days, digital technologies related with video compression and modulation/demodulation has been remarkably advanced, so that digital television broadcast, whose standard is locally under discussion, is being introduced in air broadcasting system. The digital television broadcast system has adopted MPEG standard as video and audio compression method.

The digital broadcast system can provide higher quality than analog system, transmit several different programs through an allocated single band, and make it possible to fully use resources and media for digital communication and storage.

In digital broadcasting system, several programs whose data are encoded to MPEG are multiplexed and then delivered in the format of TS (Transport Stream) to a receiving terminal such as a STB (Set Top Box). The receiving terminal extracts the TS carrying a selected program from received data and decodes the extracted TS into original audio and video signal which are applied to a displaying apparatus such as a television set.

FIG. 1 depicts a digital broadcast receiving system schematically. This system consists of a STB 100, a streamer 200, IEEE 1394 communication line, and a conventional television set 300. In the STB 100, a receiving unit 11 receives digital television broadcast signal, which includes encoded several programs, and extracts TS carrying a desirable program selected by a controller 14 according to user's command. The extracted TS is decoded into video and audio signal by a TS decoder 12 and then outputted to a television set 300. Otherwise, the extracted TS is delivered to the streamer 200 through IEEE 1394 interfaces 13 and 21 to record the selected program to a disk storage medium 23.

The STB 100 can also receive TS-formatted program recorded in the disk storage medium 23 from the streamer 200 through the IEEE 1394 interfaces 13 and 21, and decode the received TS to video and audio signal through the TS decoder 12. The decoded video and audio signal are outputted to the television set 300.

In the meantime, a high-density DVD (Digital Versatile Disk) is being developed to record high-quality moving pictures of high definition grade since a digital television set being able to present an HDTV signal is being commercialized. The storage capacity target of a high-density DVD is about 15 Gbytes which is 3.2 times of about 4.7 Gbytes of a conventional DVD. It is possible to record in a high-density DVD about 135 minute-long moving picture data of high definition grade.

Therefore, a standard for recording an HDTV signal broadcasted from a broadcasting station to a writable high-density DVD through a STB and a streamer as aforementioned is under discussion among related companies.

However, a provisional standard for a streamer specifies that acceptable maximum input bit rate is about 11.0 Mbps whereas the data bit rate of moving pictures of high definition grade has a range of 19.26~23 Mbps. As a result, a streamer observing the provisional standard can not record high definition moving pictures broadcasted from a broadcasting station to a disk recording medium normally. Therefore, a new recording method for an HDTV signal is needed.

In addition, if an HDTV signal is widely used in the near future, there will be great need of receiving HDTV program directly without an intermediary STB and recording it.

SUMMARY OF THE INVENTION

It is an object of the present invention to provide method and apparatus for receiving an HDTV signal without an intermediary apparatus, and recording the received signal to a writable high-density recording medium in an appropriate writing format or transmitting the received signal to an external apparatus connected through a digital interface such as IEEE 1394 standard.

An apparatus of recording an HDTV signal according to the present invention, comprises a demodulator demodulating a received HDTV signal into data streams of individual channels; a data processor extracting data stream of a channel chosen among the individual channels and converting the extracted data stream to transport stream; a stream analyzer analyzing data of the transport stream, and extracting and creating data stream-and/or recording-related information; and a writing means writing information from said stream analyzer and the transport stream from said data processor to a recording medium in a format suitable to the extracted and created information.

A method of recording an HDTV signal according to the present invention, demodulates a received HDTV signal, extracts transport stream belonging to a chosen channel among the demodulated data stream, analyzes data of the transport stream, extracts and creates data stream- and/or recording-related information, and writes the data stream-and/or recording-related information and the transport stream to a recording medium in a format suitable to the extracted and created information.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENT

In order that the invention may be fully understood, a preferred embodiment thereof will now be described with reference to the accompanying drawings.

Figure 1:
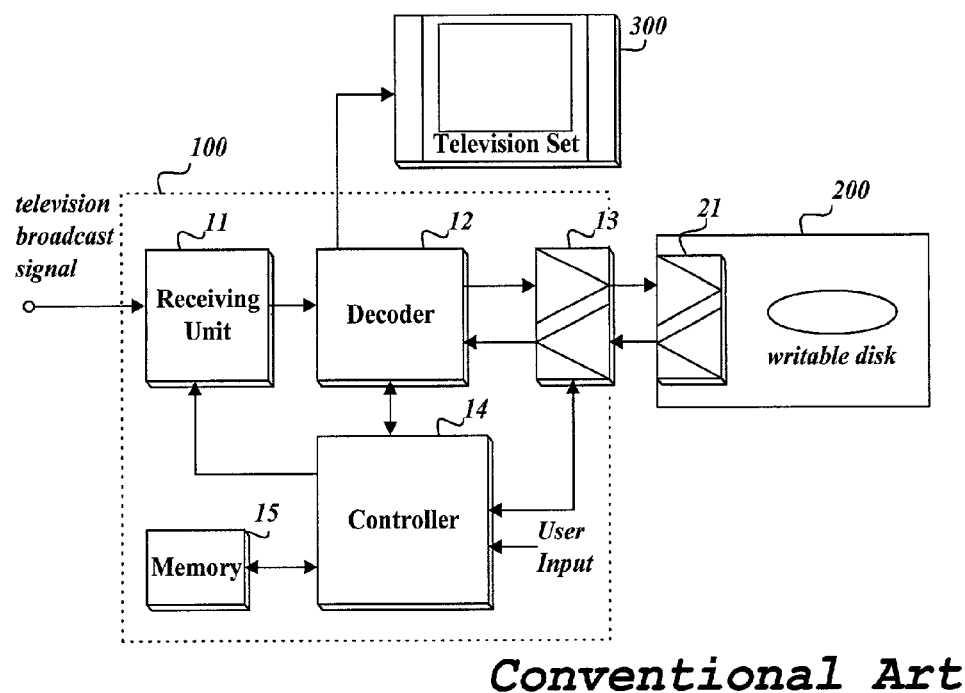
FIG. 1 depicts a digital television signal receiving system schematically.
Figure 2:
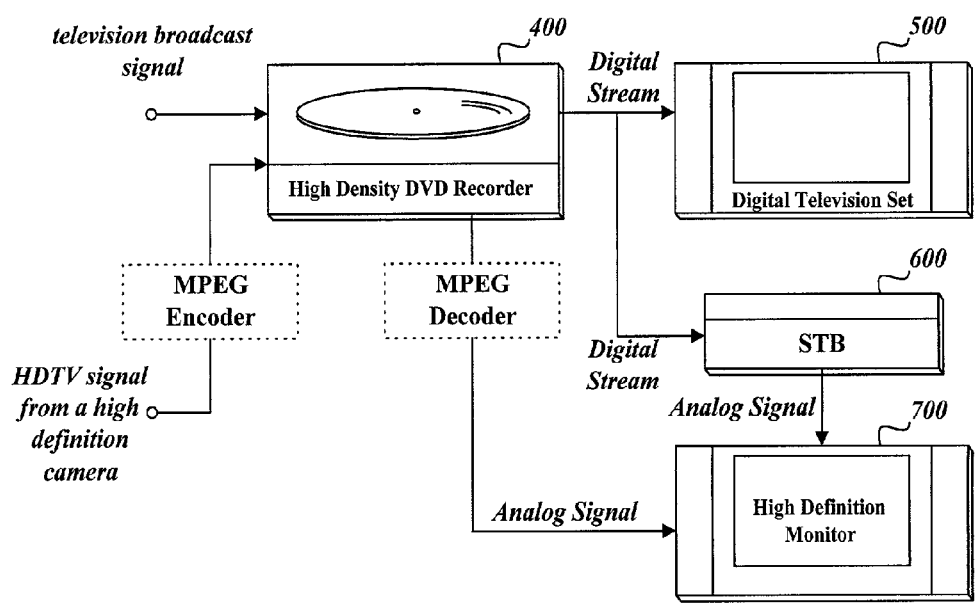
FIG. 2 shows an example of home appliance network.

FIG. 2 shows an example of home appliance network. In network of FIG. 2, a high-density DVD recorder 400 records a received HDTV broadcast signal to a writable high-density DVD or transmits the received HDTV signal to a digital television 500 being able to accept data stream of HDTV signal or a STB 600 which is connected through IEEE 1394 standard. The data stream of HDTV signal may be received from a digital broadcasting station or a high definition digital video camera connected through IEEE 1394.

The high-density DVD recorder 400 may have an MPEG decoder decoding digital data stream to analog video and audio signal which is for a high definition monitor 700 not equipping with a MPEG decoder.

The internal components of the high-density DVD recorder 400 and their operations are explained in detail hereinafter.

Figure 3:
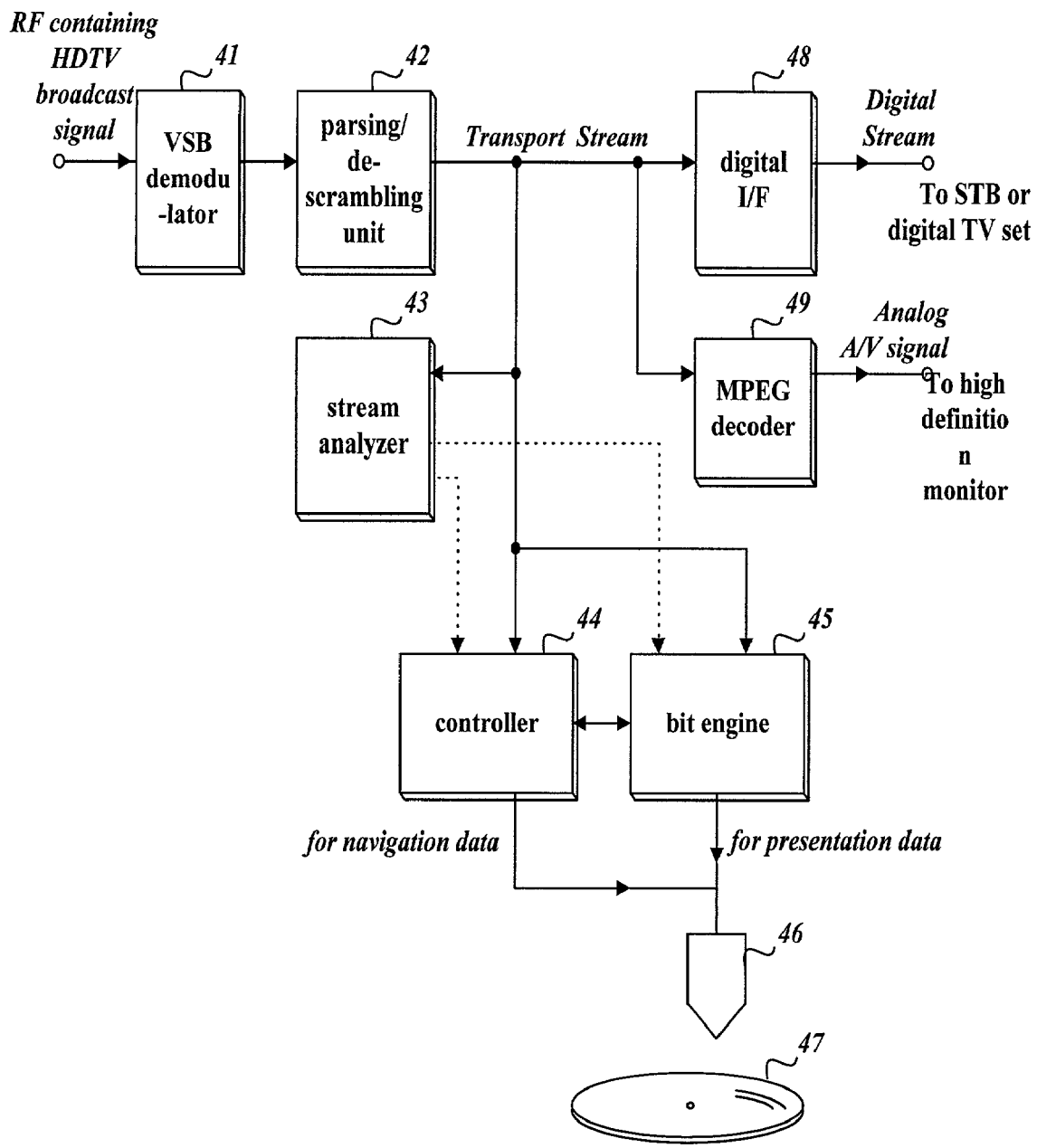
FIG. 3 is a block diagram of a high-density DVD recorder being able to record an HDTV signal according to the present invention.

FIG. 3 is a block diagram of the high-density DVD recorder 400 comprising a VSB demodulator 41 receiving an HDTV signal and demodulating it into individual channel data with VSB method; a parsing and de-scrambling unit 42 extracting data stream of a chosen channel and de-scrambling the extracted data stream into TS (Transport Stream); a stream analyzer 43 de-packetizing the TS into series of 188 byte-long TPs (Transport Packets), and extracting and analyzing necessary information for recording presentation and navigation data; a bit engine 45 reconstructing A/V presentation data of the TS into bit stream whose format is suitable to writing; a controller 44 extracting navigation data contained for management and presentation control in the TS and controlling the recording operation according the extracted navigation data; a pickup 46 writing the extracted presentation and navigation data to a high-density DVD 47; and a digital interface 48 transmitting the TS to a STB 600 or a digital television 500 through IEEE 1394 standard.

An MPEG decoder 49, which can decode TP-formatted presentation data into respective analog video and audio signal, is optionally equipped in the high-density DVD recorder 400 to support a high definition monitor 700 not having an MPEG decoder in it.

In the high-density DVD recorder 400, the VSB demodulator 41 receives a VSB-modulated HDTV signal and demodulates it into individual channel data, and the parsing and de-scrambling unit 42 extracts data stream of a program selected by a user from the demodulated channel data, and de-scrambles the extracted data stream into TS consisting of TPs.

The stream analyzer 43 de-packetizes the TS into individual 188 byte-long TPs, extracts header data of each TP, and analyzes the extracted header data. The extracted header data and the analyzed results are delivered to the bit engine 45 and the controller 44 at the same time. The controller 44 determines the recording format of presentation and navigation data based on the received header data and analyzed results.

Figure 4:
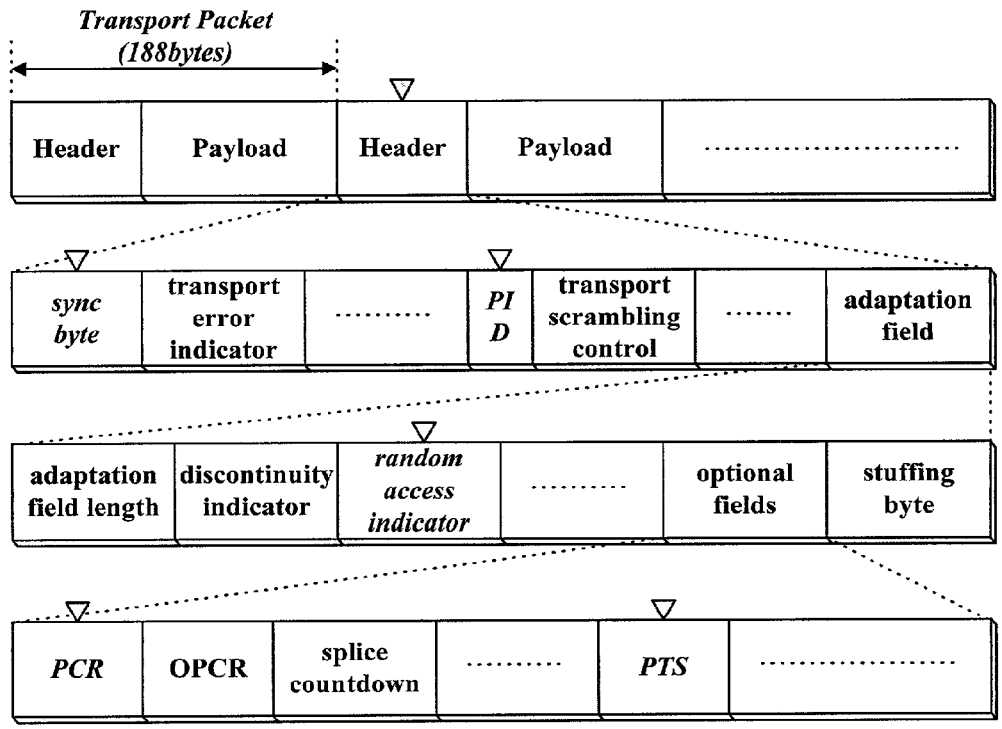
FIG. 4 depicts data format of a TP (Transport Packet) forming transport stream of a digital television broadcast signal.

In the meantime, a TP consists of a header and payload field as shown in FIG. 4. A header field contains various information for a packet, and a payload field contains substantial audio or video data to send and receive. A header includes a sync byte, a PID (Packet Identifier) indicative of type of data written in the payload field, RAI (Random Access Information) indicative of whether this packet is accessible in random, a PCR (Program Clock Reference) for clock information to refer in transmitting TPs, and a PTS (Presentation Time Stamp) for time information to refer in presenting a corresponding TP.

The stream analyzer 43 reads each header and interprets the aforementioned various information from data written in the header. The interpreted information is delivered to the bit engine 45 and the controller 44 at the same time, and it is used as information for determining the presentation and navigation data recording format of the high-density DVD 47. For example, presentation data are recorded such that it has time information on transmitting intervals based on the PTS written in each header, and the number of pictures per an unit of time, for example, 1 second, which is obtained from the data analysis, is written as navigation data.

Figure 5:
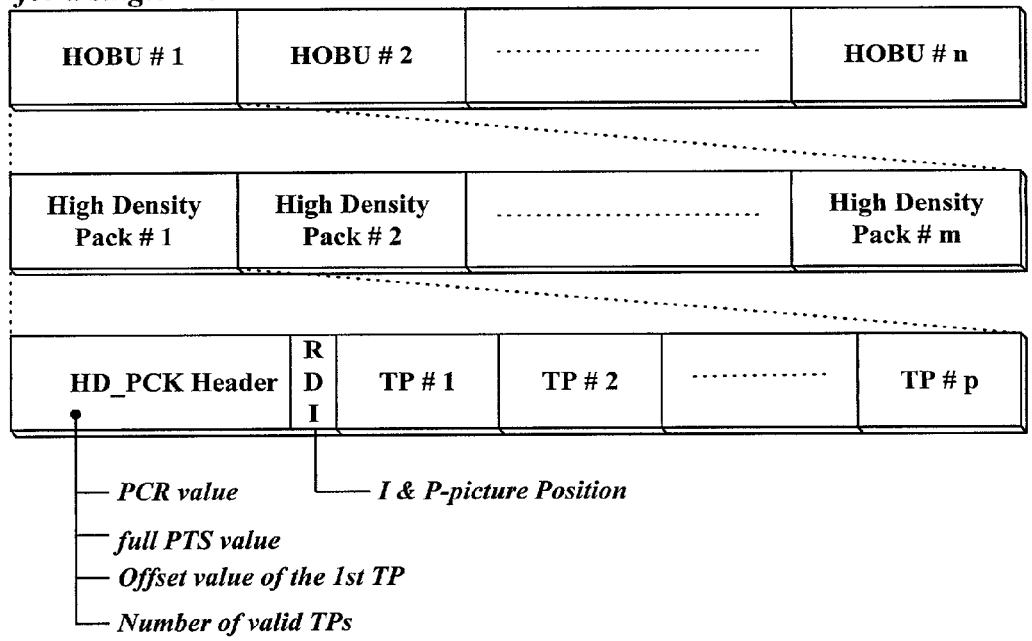
FIGS. 5 and 6 are examples of data stream recorded according to the present invention.

FIG. 5 is an example of data stream recorded based on PTS information written in a packet header. For this exemplary recording, the stream analyzer 43 not only extracts PID, RAI, PCR, if any, and PTS and analyses them but also discriminates between video and audio packets, and sends the extracted data and the analyzed information such as position information of I-pictures (Infra-coded) and P-pictures (Predictive) to both of the bit engine 45 and the controller 44.

The bit engine 45 records presentation data in a high-density stream object (called 'HOB' hereinafter) as shown in FIG. 5 using the data and information from the stream analyzer 43. The recorded HOB consists of a plurality of high-density stream object units (called 'HOBU's hereinafter), and each HOBU is written in several high-density packs. A high-density pack consists of a header and data field in which several TPs are written.

A RDI (Real-time Data Information), which is indicative of sector positions of I-pictures and/or P-pictures for random access during trick play, is written before transport stream in the first high-density pack of each HOBU. This RDI is acquired with reference to the analyzed information of the stream analyzer 43 and data stream recorded positions by the bit engine 45.

The extracted PTS and PCR by the stream analyzer 43 are also written in a header of a pack. A distance offset of the first TP from starting position of a pack is calculated by the bit engine 45 and then written in the header. The number of TPs is counted for a pack and is also written in the header.

The transport stream is recorded by the bit engine 45 such that an arbitrary HOBU begins from the starting data of a GOP (Group of Pictures), which includes at least one I-picture. Such writing alignment is accomplished with reference to presentation time relation between audio and video packets and whether or not an I-picture is included in the current data stream. This referring information is also received from the stream analyzer 43.

In the meantime, the controller 44 calculates PTS time difference between start and end position of each HOBU based on PTS of each TP, which is received from the stream analyzer 43, as well as the size of that HOBU, and writes the calculated time difference and size information in a mapping list which is one of disk navigation data and is used for mainly searching operation.

Due to the method of recording the received data stream after analyzing it, it is possible to adapt the recording format to the received data stream.

Figure 6:
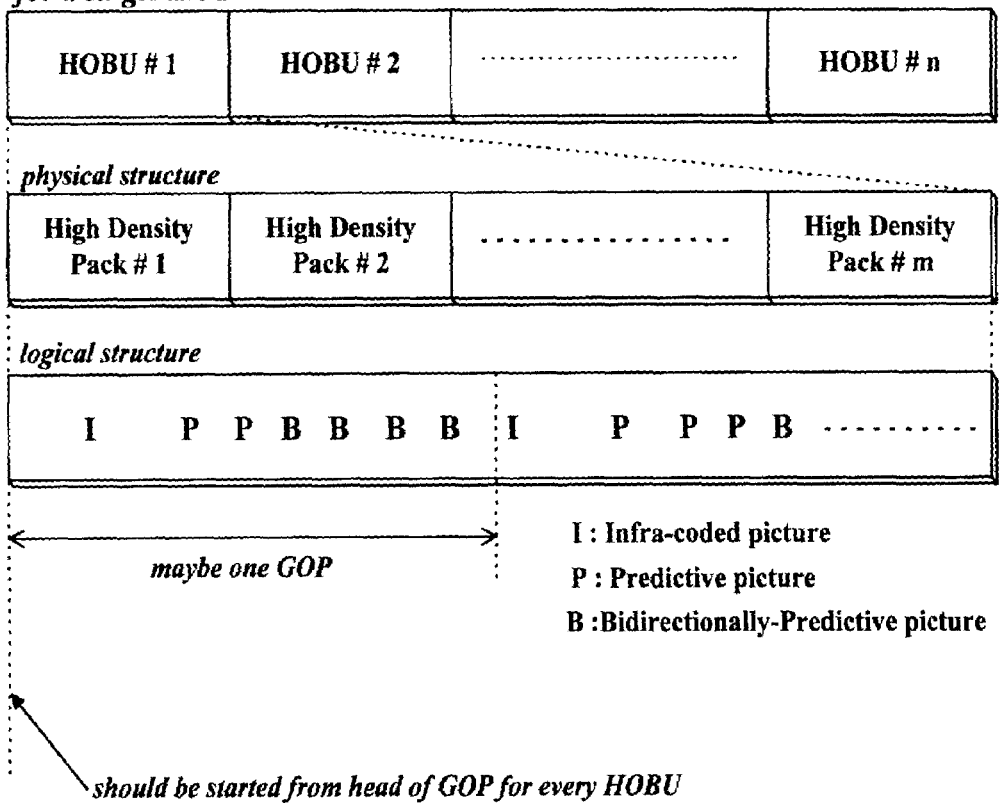

FIG. 6 is an example of recorded data stream according to the above-explained aligning method between an arbitrary HOBU and GOP start.

For recording as in FIG. 6, if necessary, the stream analyzer 43 reconstructs discriminated video packets into MPEG-formatted stream, calculates the size of each GOP, the number of pictures in a GOP, and/or frame rate such as time per a picture based on the information written in an MPEG header of the reconstructed MPEG stream, and sends the calculated data to the bit engine 45 and the controller 44.

The bit engine 45 may write the received the number of GOPs and location information of each GOP, which is calculated based on the received size of each GOP, in the aforementioned RDI as information to refer for random access, instead of the written information as RDI in the embodiment of FIG. 5.

The controller 44 calculates the number of pictures contained in each HOBU, which is grouped by the bit engine 45 while recording, and the size of each HOBU based on the received information from the stream analyzer 43, and writes the calculated data in each entry of the mapping list. Each entry is associated with each HOBU. The controller 44 also writes the received information on frame rate in the field of HOB General Information, which is for a collection of recorded HOBUs, that is, HOB.

The digital television broadcast signal recording method and apparatus according to the present invention, records a directly-received an HDTV broadcast signal without any intermediary signal receiving apparatus such as a set top box to a high-density recording medium in an appropriate recording format after analyzing the received signal, or transmits it to an external apparatus connected through a digital interface such as IEEE 1394. In addition, trick play for recorded HDTV broadcast signal can be smoothly conducted due to such recorded format and various written information which has been obtained from analysis of received data stream of HDTV signal.

The invention may be embodied in other specific forms without departing from the sprit or essential characteristics thereof. The present embodiments are Therefore to be considered in all respects as illustrative and not restrictive, the scope of the invention being indicated by the appended claims rather than by the foregoing description and all changes which come within the meaning and range of equivalency of the claims are Therefore intended to be embraced therein.

What is claimed is:

1. An apparatus of recording an input signal, comprising:
   a demodulator demodulating an input signal into data streams of individual channels;
   a data processor extracting data stream of a channel chosen among the individual channels and converting the extracted data stream to transport stream;
   a stream analyzer analyzing data of the transport stream, and extracting and creating data stream- and/or recording-related information; and
   a writing means writing information from said stream analyzer and the transport stream from said data processor to a recording medium in a format suitable to the extracted and created information,
   wherein said writing means calculates time length of each high-density stream object unit based on presentation time stamp, which is one of the extracted information from said stream analyzer, and writes the calculated time length as navigation data.

2. The apparatus set forth in claim 1, wherein said stream analyzer analyzes each header of transport packets forming the transport stream to obtain said data stream- and/or recording-related information.

3. The apparatus set forth in claim 1, wherein said stream analyzer reconstructs the transport stream into MPEG-formatted stream and analyzes MPEG header of the MPEG-formatted stream to obtain said data stream- and/or recording-related information.

4. The apparatus set forth in claim 1, wherein said writing means writes the transport stream to the recording medium such that all high-density stream object units begin from starting data of a GOP based on the data stream- and/or recording-related information.

5. The apparatus set forth in claim 1, wherein said data stream- and/or recording-related information is for trick play.

6. The apparatus set forth in claim 5, wherein said writing means writes the information for trick play in an only first pack of each high-density stream object unit.

7. The apparatus set forth in claim 6, wherein said writing means writes the information for trick play before the transport stream to be recorded in the first pack.

8. The apparatus set forth in claim 1, further comprising an interfacing unit transmitting the transport stream outputted from said data processor to an external apparatus.

9. The apparatus set forth in claim 1, further comprising a converter decodes the transport stream outputted from said data processor to analog video and audio signal, and outputs the analog video and audio signal to an external apparatus.

10. A method of recording an input signal, comprising:
    (a) demodulating an input signal into data stream and extracting transport stream belonging to a chosen channel among the demodulated data stream; and
    (b) analyzing data of the transport stream, extracting and creating data stream- and/or recording-related information, and writing the data stream- and/or recording-related information and the transport stream to a recording medium in a format suitable to the extracted and created information,
    wherein said step (b) comprises calculating time length of each high-density stream object unit based on presentation time stamp, which is one of the extracted information, and writes the calculated time length as navigation data.

11. The method set forth in claim 10, wherein said step (b) analyzes each header of transport packets forming the transport stream to obtain said data stream- and/or recording-related information.

12. The method set forth in claim 10, wherein said step (b) reconstructs the transport stream into MPEG-formatted stream and analyzes MPEG header of the MPEG-formatted stream to obtain said data stream- and/or recording-related information.

13. The method set forth in claim 10, wherein said step (b) writes the transport stream to the recording medium such that all high-density stream object units begin from starting data of a GOP based on the data stream- and/or recording-related information.

14. The method set forth in claim 10, wherein said data stream- and/or recording-related information is for trick play.

15. The method set forth in claim 14, wherein said step (b) writes the information for trick play in an only first pack of each high-density stream object unit.

16. The method set forth in claim 15, wherein said step (b) writes the information for trick play before the transport stream to be recorded in the first pack.

17. The method set forth in claim 10, wherein said information for trick play includes location information of Infra-coded and predictive pictures.

18. The method set forth in claim 10, wherein said information for trick play consists of the number of GOPs and location information of each GOP.

19. An apparatus of recording an input signal, the apparatus comprising:
    a demodulator demodulating an input signal transmitted on over multiple paths;

a data processor choosing a first path from among the multiple paths and converting the input signal to a transport stream;

a stream analyzer analyzing data of the transport stream, and extracting and creating data stream- and/or recording-related information; and a writing means writing information from said stream analyzer and the transport stream from said data processor to a recording medium in a format suitable to the extracted and created information, wherein said writing means calculates time length of each high-density stream object unit based on presentation time stamp, which is one of the extracted information from said stream analyzer, and writes the calculated time length as navigation data.

20. The apparatus set forth in claim 19, wherein said stream analyzer analyzes each header of transport packets forming the transport stream to obtain said data stream- and/or recording-related information.

21. The apparatus set forth in claim 19, wherein said stream analyzer reconstructs the transport stream into MPEG-formatted stream and analyzes MPEG header of the MPEG-formatted stream to obtain said data stream- and/or recording-related information.

22. The apparatus set forth in claim 19, wherein said writing means writes the transport stream to the recording medium such that all high-density stream object units begin from staffing data of a GOP based on the data stream- and/or recording-related information.

23. The apparatus set forth in claim 19, wherein said data stream- and/or recording-related information is for trick play.

24. A method of recording an input signal, the method comprising:

demodulating an input signal into a data stream and extracting a transport stream belonging to a chosen path among the demodulated data stream; and analyzing data of the transport stream, extracting and creating data stream- and/or recording-related information, and writing the data stream- and/or recording-related information and the transport stream to a recording medium in a format suitable to the extracted and created information, wherein said analyzing comprises calculating time length of each high-density stream object unit based on presentation time stamp, winch is one of the extracted information, and writes the calculated time length as navigation data.

25. The method set forth in claim 24, wherein said step (b) reconstructs the transport stream into MPEG-formatted stream and analyzes MPEG header of the MPEG-formatted stream to obtain said data stream- and/or recording related information.

26. The method set forth in claim 24, wherein said step (b) writes the transport stream to the recording medium such that all high-density stream object units begin from starting data of a GOP based on the data stream- and/or recording-related information.

27. A method of reproducing a signal from a recording medium, the method comprising:

reading a data from a recording medium;

analyzing the data to reproduce a signal for a transport stream;

transmitting the signal over a transport stream in a first path; and modulating the transport stream into a data stream transmitted over multiple paths;

wherein said analyzing comprises calculating time length of each high-density stream object unit based on presentation time stamp, wherein the the calculated time length is written as navigation data.

28. The method set forth in claim 27, wherein each header of transport packets forming the transport stream is analyzed to obtain said data stream- and/or recording-related information.

* * * * *